June 24, 1969  R. W. DIBRELL  3,451,623
LAWN SPRINKLER
Filed May 31, 1966
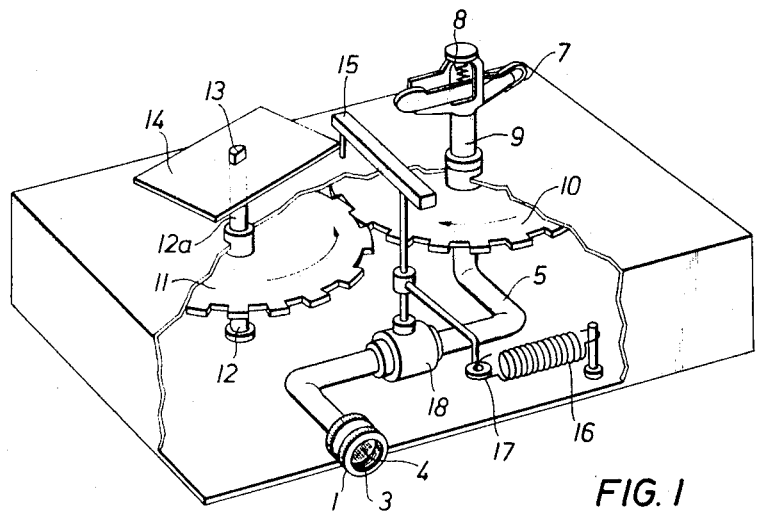
FIG. 1
FIG. 2
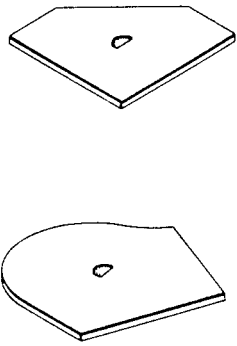
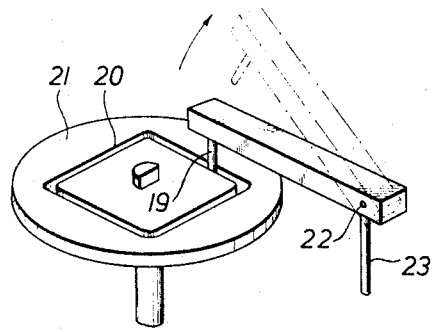
FIG. 4
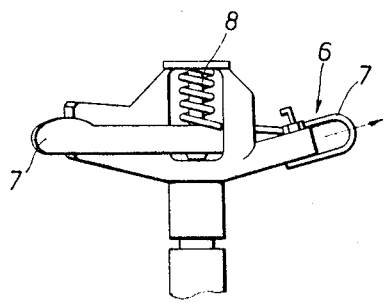
FIG. 3
Robert W. Dibrell
INVENTOR
BY Arnold, Roylance,
Kruger & Durkee
ATTORNEYS United States Patent Office 3,451,623
Patented June 24, 1969

3,451,623
LAWN SPRINKLER
Robert W. Dibrell, 14523 Quention Road, Houston, Tex. 77045
Filed May 31, 1966, Ser. No. 554,121
Int. Cl. B05b 3/02, 3/14, 15/04
U.S. Cl. 239—97                                 10 Claims

ABSTRACT OF THE DISCLOSURE

A lawn sprinkling device suitable for spraying water in a variety of patterns conforming to the shape of the area to be sprinkled utilizes a radially automotive nozzle which produces a corresponding rotation of a cam mounted in a position spaced from the nozzle. The cam corresponds to the configuration of the area to be sprinkled, and accordingly, a flow regulator which follows the cam will deliver water to the nozzle in varying amounts corresponding to the distance to be covered by the spray from the nozzle in each position.

---

The instant invention relates to a novel sprinkling device of the type adaptable for use in the sprinkling of lawns. More precisely, the instant invention provides a novel sprinkling device which can be pre-programmed to deliver a spray pattern of virtually any desired shape.

The difficulties accruing to the home owner in attempting to adequately and completely supply water to all portions of an irregularly shaped lawn are readily appreciated. To this end a variety of lawn sprinkling devices have been designed to supply a spray pattern conforming to variously shaped areas. However, such devices almost inevitably provide a single regular spray pattern, i.e., one that is square, circular, rectangular, or the like.

Thus, there is a decided need for a simple lawn sprinkling device which can be pre-programmed to deliver a variety of irregularly shaped spray patterns, and which can accordingly deliver water sufficiently and completely over the entire surface of an irregularly shaped area.

There is provided by the instant invention a novel sprinkling device wherein the supply of water to a radially automotive nozzle, for example of the rotating or oscillating type, is constantly modulated and controlled so as to confine the spray pattern within the limits of a pre-programmed area.

By the term "radially automotive nozzle" as used herein is meant a nozzle which is made to rotate or oscillate to direct its spray over a radial or angular area, the force or impulse producing this rotation or oscillation being supplied by the force and pressure of liquid passing through the nozzle.

It is accordingly an object of this invention to provide a novel sprinkling device having a radially auomotive spray head or nozzle. It is a further object of this invention to provide a novel sprinkling device which is capable of regulating the flow of water to the spray head or nozzle. It is a still further object of this invention to provide a lawn sprinkler wherein water is supplied to a rotating or oscillating spray head or nozzle in variable amounts corresponding to the distance to the limits of the area to be sprayed. It is a further object of this invention to provide a sprinkling device which may be programmed to confine its spray within a predetermined and irregular area. It is a still further object of the instant invention to provide such a lawn sprinkling device which may be readily variably pre-programmed to produce spray patterns of differing irregularly shaped areas.

Although the instant invention is discussed primarily in the context of is use as a lawn sprinkler, it will be understood that the instant invention admits of use as a sprinkling device for other and varying applications as will be obvious to those skilled in the art.

These and other objects are obtained according to the instant invention by which there is provided a novel lawn sprinkler comprising a water inlet, a radially automotive oscillating or rotating water discharge means such as a spray head or a spray nozzle, a cam responsive to the rotation or oscillation of said water discharge means, a flow regulation means intermediate said inlet and said water discharge means, said flow regulation means being adapted to follow said cam whereby the flow of water to said water discharge means is regulated.

In order that the manner in which the foregoing and other objects attained in accordance with this invention can be understood in detail, one advantageous embodiment of this invention will be described with reference to the accompanying drawings which form a part of this specification.

FIGURE 1 is a pictorial cutaway view of a sprinkler which illustrates one embodiment of this invention.

FIGURE 2 is a pictorial representation of several differently shaped cams which may be employed in the sprinkler illustrated in FIGURE 1.

FIGURE 3 is a detail view of a step-by-step rotating sprinkler nozzle shown in FIGURE 1.

FIGURE 4 shows a further embodiment of this invention wherein a tongue and groove cam arrangement is utilized.

Referring now to FIGURE 1 there is shown one embodiment of the instant invention wherein a water inlet 1 is affixed through the wall of the sprinkler base 2. Commonly the water inlet will be equipped with a suitably threaded member 3 to receive the outlet end of a hose. A screen 4 or other suitable filtering device is desirably placed in the inlet to screen foreign particles which might otherwise clog or jam the mechanisms of the sprinkler. The inlet is connected by conduit 5 to a spray nozzle 6. The spray nozzle illustrated is a step-by-step rotating sprinkler of the type well known in the art wherein the water discharged from a water outlet nozzle impinges on spring-loaded lever 7 which is alternately forced out of the water stream and spring returned by spring 8 to partially impinge upon the water stream. The oscillation of lever 7 serves not only to break up and diffuse the water stream and produce a random spray proximate to the nozzle, but also together with the operation of the spring, the constant oscillatory motion of this lever serves to rotate the nozzle. Such a rotatable sprinkler head is shown in U.S. Patent 2,600,987. Although the stepwise type of rotating nozzle is illustrated, it is emphasized that any type of automotive rotating or oscillating nozzle which produces a rotation sufficiently slow as to render insignificant the lag time between the effect of water flow regulation and nozzle position may be used.

The rotating stem 9 of the nozzle is then fixedly connected to a first gear means 10 rendering the gear means responsive to the rotation or oscillation of the nozzle 6. First gear 10 engages second gear 11 rotatably mounted on spindle 12 which is affixed to the base 2. The said gear engagement is preferably such as to produce a one-to-one ratio of rotation between gears 10 and 11. The extension of spindle 12, 12a extends above gear 11 and is keyed at the top 13 to receive a cam 14 the configuration of which corresponds to the configuration of the area to be sprayed. Other cams such as those illustraed in FIGURE 2 may be interchangeably used. A suitable cam follower 15 rides the edge of cam 14 and is spring loaded to remain in contact with the cam by use of spring 16 and lever 17 said spring being fixedly attached to the base 2. Cam follower 15 is directly attached to a valve such as a butterfly valve suitably housed in housing 18 and residing in conduit 5.

Valve 18 should be such that in the "open" position it offers substantially no obstruction to the passage of water through conduit 5. However, in the "closed" position it is preferred that valve 18 not completely obstruct the passage of water through conduit 5 inasmuch as passage of water to the nozzle is necessary to provide the needed nozzle rotation or oscillation.

It will be quite obvious to those skilled in the art that the instant invention is not restricted solely to devices of the type specifically illustrated in FIGURE 1. For example, cam 14 could be mounted directly upon stem 9 of the spray nozzle. In such an embodiment cam follower 15 would then be spring loaded to ride the edge of the cam producing the same effects of water regulation to the spray nozzle. The particular embodiment illustrated in FIGURE 1 makes it extremely easy to interchange various cams, such as those in FIGURE 2 corresponding to particular desired spray patterns.

Further modifications may be made with respect to the method in which cam follower 15 follows cam 14. For example, in FIGURE 4, there is illustrated a cam arrangement wherein cam follower 15 is equipped with a tongue 19 which rides in a groove 20 of cam 21. The groove corresponds to the spray program and to the configuration of the area to be sprayed. Cam follower 15 is hinged at 22 with respect to upright rod 23 which, as may be seen in FIGURE 1, is attached to the water control valve in housing 18.

The arrangement shown in FIGURE 4 would eliminate the need for spring-loading the cam follower 15, and would also enable the "programming" of two configural spray patterns on each of the two surfaces of the single cam slab.

Thus in operation water or whatever liquid is to be sprayed entering inlet 1 proceeds to conduit 5 past valve 18 to spray nozzle 6 wherein the pressure of the water serves to provide the force to oscillate or rotate the nozzle. As the nozzle rotates, the cam corresponding in shape to the area to be sprayed is correspondingly rotated thus regulating the amount of water supplied to the nozzle in accordance with the distance the spray pattern is to cover. The cam 14 illustrated in FIGURE 1 is a rectangular cam which would produce a spray covering a rectangular area of similar proportion. Similarly, the cams of FIGURE 2 can be employed to create spray patterns corresponding to their configuration. Such an effect can be most easily achieved when any angular rotation of the nozzle produces a like angular rotation of the cam. Other cam arrangements can however be employed.

The rotation or oscillation of the cam is preferably a slow motion such that as the nozzle changes its direction of spray the effect of the water regulation to the nozzle will adjust to project the spray pattern to the limit of the desired area. A step-by-step rotating nozzle or a slowly oscillating nozzle is preferably employed. A free-wheeling reaction type nozzle in which the sole automotive force is provided by the reaction force of the water exiting a nozzle may not be employed if it produces a rapid rotation. However, if such a reaction type nozzle is made to drive a series of gears such as in the embodiment illustrated in the figure, inertia may be built into the gear system such that the nozzle will not be rapidly free-wheeling and essentially will produce a slow rotation.

It is also pointed out that the water discharge means preferred for use in the instant invention are unidirectional nozzles or spray heads which discharge water in substantially a single lateral direction. Since the instant invention is to be employed to create a spray pattern the limits of which may be made to conform to an irregularly shaped area it is obvious that a nozzle producing two equal spray streams in directly opposite directions does not fully utilize the advantages of this device. However, nozzles which provide a light spray in a different or opposite direction to the main spray, the light spray being designed to spray a limited area proximate to the sprinkler itself could obviously be advantageously used. In any case, the nozzle design should be such as to afford good water distribution over the entire spray pattern from the area proximate the sprinkler to the areas at the periphery of the spray pattern.

While the instant invention has been described in terms of a particularly advantageous embodiment and several modifcations thereof, it will be obvious to those skilled in the art that various changes and modifications may be made without departing from the scope or spirit of this invention.

What is claimed is:

1. A sprinkling device which comprises
   (a) a water inlet;
   (b) a radially automotive spray nozzle communicating with said water inlet;
   (c) a first gear means attached to said spray nozzle and suitable for responding to the radial motion of said spray nozzle;
   (d) a second fear means engaging said first gear and producing a counter-rotation in response to the rotation of said first gear;
   (e) a cam mounted with said second gear suitable for rotating with said second gear; and
   (f) a flow regulation device intermediate said water inlet and said spray nozzle responsive to the configuration of said cam, to create a spray pattern corresponding to the configuration of said cam.

2. The sprinkling device of claim 1 wherein said spray nozzle is a step-by-step rotating nozzle which discharges a spray in substantially one lateral direction.

3. The sprinkling device of claim 1 wherein the engagement of said first gear means and said second gear is such that the rotation of said cam is similar to the rotation of said nozzle.

4. A sprinkling device comprising:
   (a) a water inlet;
   (b) a water discharge means communicating with said water inlet;
   (c) a cam;
   (d) shaft means for mounting said cam for rotation in a position spaced from the position of said water discharge means;
   (e) means for rotating said water discharge means and for producing a related rotation of said shaft means; and
   (f) a flow regulation means intermediate said inlet and said nozzle, said flow regulation means being responsive to the configuration of said cam to create a spray pattern corresponding to the configuration of said cam.

5. The sprinkling device of claim 4 wherein an angular rotation of said water discharge means produces the same angular rotation in said cam.

6. The sprinkling device of claim 4 wherein said nozzle discharges a spray in substantially one lateral direction.

7. The sprinkling device of claim 4 wherein said water discharge means is a radially automotive step-by-step rotating nozzle, the rotation of which produces a related rotation of said shaft means.

8. The sprinkling device of claim 4 wherein said cam has an outer configuration corresponding to said spray pattern, and said flow regulation means follows said outer configuration.

9. The sprinkling device of claim 4 wherein said cam has a groove corresponding to said spray pattern and said flow regulation means has a portion which rides in said groove.

10. A sprinkling device comprising:
    (a) a water inlet;
    (b) a radially automotive water discharge means communicating with said inlet;

(c) a cam;
(d) shaft means for mounting said cam for rotation in a position spaced from the position of said water discharge means;
(e) means for producing a rotation of said shaft means related to the rotation of said radially automotive water discharge means; and
(f) a flow regulation means intermediate said inlet and said water discharge means, said flow regulation means being responsive to the configuration of said cam such that there is created a spray pattern corresponding to the configuration of said cam.

References Cited

UNITED STATES PATENTS

| | | | |
|---|---|---|---|
| 1,983,929 | 12/1934 | Buelna et al. | |
| 2,600,987 | 6/1952 | Gallice. | |
| 2,601,559 | 6/1952 | Riblet | 239—97 |
| 2,654,635 | 10/1953 | Lazzarini | 239—232 X |
| 2,739,839 | 3/1956 | Greener et al. | 239—97 |
| 2,835,529 | 5/1958 | Egly et al. | |
| 2,962,220 | 11/1960 | Woods | 239—97 |
| 3,070,315 | 12/1962 | Landry | 239—97 X |
| 3,081,037 | 3/1963 | Kennedy | 239—97 |

FOREIGN PATENTS 93,509  3/1959  Norway.

ALLEN N. KNOWLES, *Primary Examiner.*

B. BELKIN, *Assistant Examiner.*

U.S. Cl. X.R.

239—230, 236, 241